(12) United States Patent
Mashiki

(10) Patent No.: US 7,305,957 B2
(45) Date of Patent: Dec. 11, 2007

(54) VALVE TIMING CONTROL APPARATUS AND METHOD FOR INTERNAL COMBUSTION ENGINE

(75) Inventor: Zenichiro Mashiki, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 18 days.

(21) Appl. No.: 11/272,750

(22) Filed: Nov. 15, 2005

(65) Prior Publication Data

US 2006/0102125 A1   May 18, 2006

(30) Foreign Application Priority Data

Nov. 16, 2004   (JP) .............................. 2004-331738

(51) Int. Cl.
    *F02N 1/00*      (2006.01)
    *F01L 1/34*      (2006.01)
(52) U.S. Cl. ............................... 123/179.4; 123/179.3; 123/90.15
(58) Field of Classification Search ............. 123/179.4, 123/90.11, 90.15, 179.16, 179.3
    See application file for complete search history.

(56) References Cited

U.S. PATENT DOCUMENTS 4,466,392 A * 8/1984 Uchida et al. ........... 123/179.4
7,159,545 B2 * 1/2007 Miyakoshi et al. ...... 123/90.15
7,159,555 B2 * 1/2007 Nohara et al. .......... 123/179.18
7,168,410 B2 * 1/2007 Kato et al. .............. 123/339.15

FOREIGN PATENT DOCUMENTS

| JP | A 06-257477   | 9/1994  |
| JP | A 2000-204987 | 7/2000  |
| JP | A 2001-289086 | 10/2001 |
| JP | A 2004-176686 | 6/2004  |

* cited by examiner

*Primary Examiner*—Stephen K. Cronin
*Assistant Examiner*—Ka Chun Leung
(74) *Attorney, Agent, or Firm*—Oliff & Berridge, PLC

(57) ABSTRACT

A control apparatus includes a driving device that is capable of operating regardless whether the engine is running or not. A variable valve actuation mechanism is driven by the driving device. During an idling operation of the engine, a control section controls the driving device such that the variable valve actuation mechanism maintains the valve timing at a valve timing advanced relative to a most retarded valve timing. The control section controls the driving device such that the variable valve actuation mechanism changes the valve timing to the most retarded valve timing after a stopping operation of an autonomous operation of the engine is initiated. Therefore, shock due to the initiation of the engine starting operation is reduced without decreasing fuel economy.

10 Claims, 4 Drawing Sheets

(a) Engine Speed (b) Cranking of Predetermined Crank Angle executed after Engine Starting Process is initiated (c) Valve Timing of Intake Valve

VALVE TIMING CONTROL APPARATUS AND METHOD FOR INTERNAL COMBUSTION ENGINE

BACKGROUND OF THE INVENTION

The present invention relates to a valve timing control apparatus and method for internal combustion engines.

To optimize the power and fuel economy throughout the entire engine operating range, internal combustion engines, such as automobile engines, that are equipped with a variable valve actuation mechanism for changing the valve timing of intake valves according to the engine operating state have been made practical. For example, variable valve actuation mechanisms are known that are provided with oil from a mechanical oil pump and operate based on the pressure of the oil.

To perform stable combustion while guaranteeing necessary compression ratio during an idling operation of such an internal combustion engine, the valve timing of intake valves is set to timing that guarantees the necessary compression ratio (hereinafter, referred to as idling valve timing).

Also, when an engine starting operation is initiated (when cranking of the engine is started), the compression ratio is preferably lowered to reduce shock. Specifically, it is preferable that the valve timing of the intake valves be further retarded compared to the idling valve timing to the most retarded timing so that the valves are closed at the most retarded timing.

Therefore, after an engine stopping operation is initiated during idling, the valve timing of the intake valves is changed from the idling valve timing to the most retarded timing in preparation for the next initiation of the engine starting operation (refer to Japanese Laid-Open Patent Publication No. 2000-204987).

When the stopping operation of an internal combustion engine is initiated, the pressure of oil discharged by a mechanical oil pump substantially drops to zero in accordance with a reduction in the engine speed, and the power for operating the variable valve actuation mechanism is also reduced. Therefore, in the period from when the stopping operation is initiated during idling to when the engine rotation is actually stopped, the valve timing of the intake valves cannot necessarily retarded to the most retarded timing. If the valve timing of the intake valves are not retarded to the most retarded timing until the engine rotation is stopped, the initiation of the next engine starting operation will be executed with a high compression ratio. Occupants of the vehicle therefore are likely to feel shock when cranking is started.

To deal with such problems, it may be configured that, when stopping an internal combustion engine, the valve timing of the intake valves are changed to the most retarded timing before initiating an operation for stopping autonomous operation of the engine. In this case, however, idling must be continued until the valve timing of the intake valves are changed to the most retarded timing. During idling in this state, the valve timing is more retarded compared to that during normal idling, i.e., idling valve timing. Thus, combustion cannot be performed while guaranteeing necessary compression ratio. This inevitably destabilizes the combustion and decreases the fuel economy.

SUMMARY OF THE INVENTION

Accordingly, it is an objective of the present invention to provide a valve timing control apparatus for an internal combustion engine that changes the valve timing of intake valves to the most retarded timing when initiating an engine starting operation without decreasing fuel economy, and reduces shock due to the initiation of the engine starting operation. The present invention also provides a valve timing control method for an internal combustion engine To achieve the above-mentioned objective, the present invention provides a valve timing control apparatus for an intake valve of an internal combustion engine. The control apparatus includes a driving device that is capable of operating regardless whether the engine is running or not. A variable valve actuation mechanism changes the valve timing of the intake valve. The variable valve actuation mechanism is driven by the driving device. During an idling operation of the engine, a control section controls the driving device such that the variable valve actuation mechanism maintains the valve timing at a valve timing advanced relative to a most retarded valve timing. The control section controls the driving device such that the variable valve actuation mechanism changes the valve timing to the most retarded valve timing after a stopping operation of an autonomous operation of the engine is initiated.

Further, the present invention provides a valve timing control method for an intake valve of an internal combustion engine. The control method includes varying the valve timing of the intake valve by using a variable valve actuation mechanism; driving the variable valve actuation mechanism by a driving device that is capable of operating regardless whether the engine is running or not. During an idling operation of the engine, the driving device is controlled such that the variable valve actuation mechanism maintains the valve timing at a valve timing advanced relative to a most retarded valve timing. The driving device is controlled such that the variable valve actuation mechanism changes the valve timing to the most retarded valve timing after a stopping operation of an autonomous operation of the engine is initiated.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments, together with the accompanying drawings in which.

DETAILED DESCRIPTION OF THE PREFERRED EMBODIMENTS

A preferred embodiment will now be described with reference to FIGS. 1 to 5. In this embodiment, the present invention is applied to an automobile engine that is automatically stopped and restarted.

Figure 1:
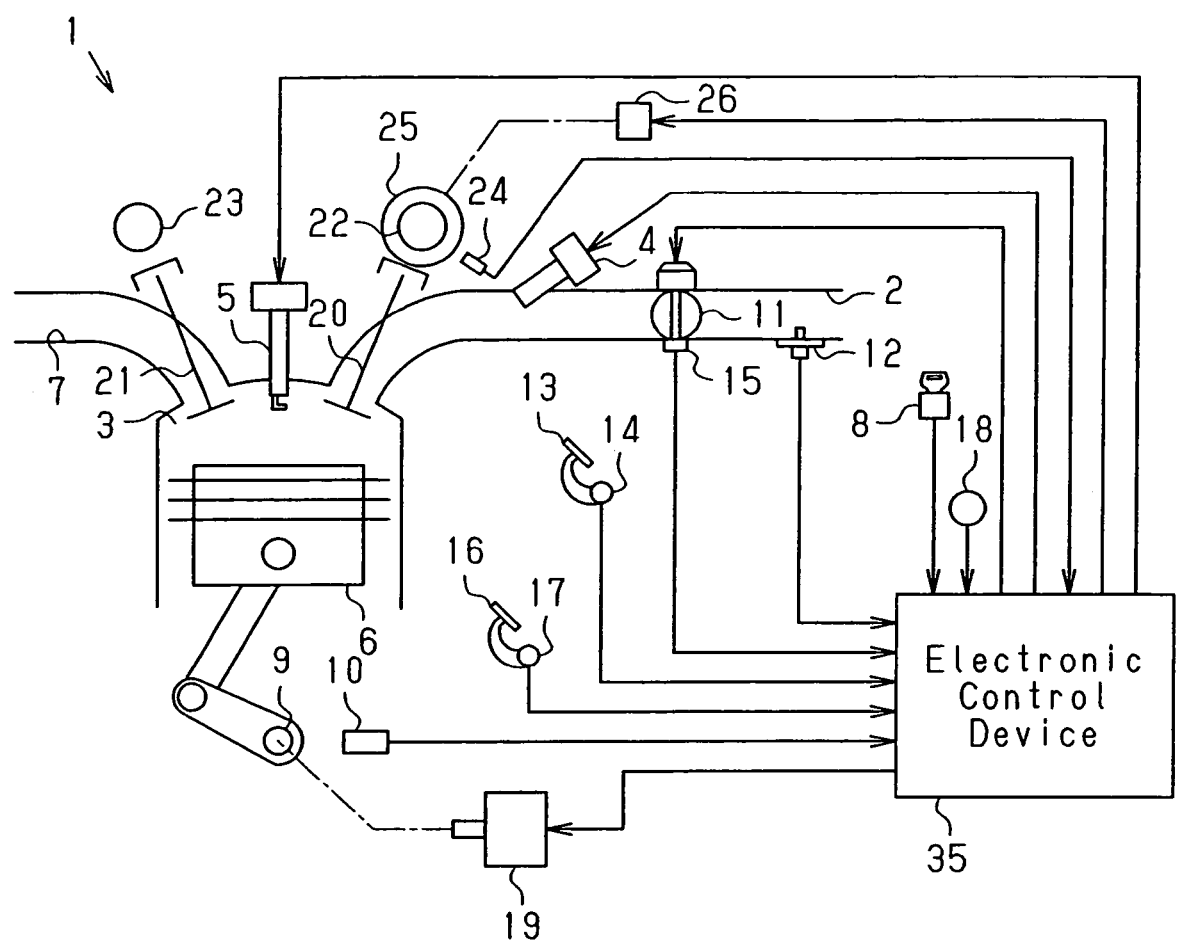
FIG. 1 is a diagrammatic view illustrating an entire engine to which a valve timing control apparatus according one embodiment is applied.
Figure 2:
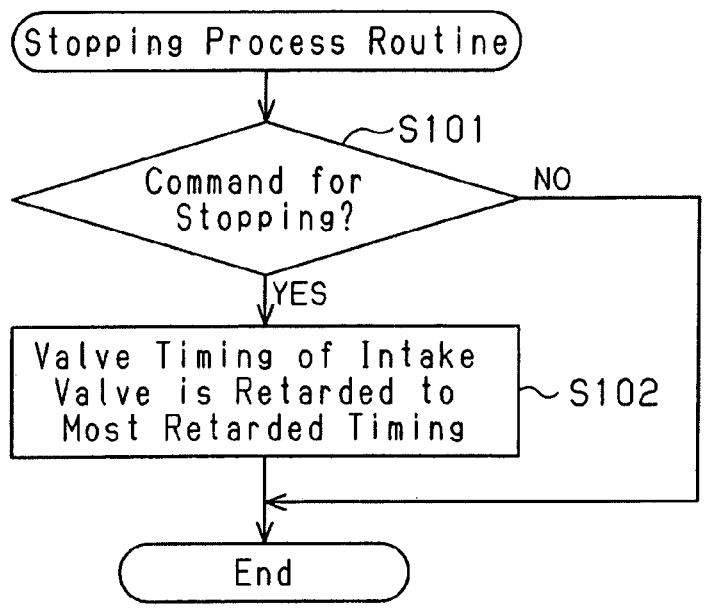
FIG. 2 is a flowchart showing a procedure for controlling the valve timing of intake valves when stopping the engine.

In an engine 1 shown in FIG. 1, based on depression of an accelerator pedal 13, the opening degree of a throttle valve 11 provided in an intake passage 2 is adjusted to control the amount of air drawn into combustion chambers 3 (only one is shown) from the intake passage 2. The engine 1 has fuel injection valves 4 each corresponding to one of the combustion chambers 3. Each fuel injection valve 4 injects fuel the amount of which corresponds to the amount of air drawn into the associated combustion chamber 3. The air-fuel mixture is ignited in each combustion chamber 3 by an ignition plug 5. The ignition burns the air-fuel mixture and produces combustion energy. The combustion energy reciprocates a piston 6. Accordingly, a crankshaft 9, which is an output shaft of the engine 1, rotates. After combustion, the air-fuel mixture, or exhaust, is sent to an exhaust passage 7 from the combustion chamber 3. The crankshaft 9 of the engine 1 is coupled to a starter 19 that forcibly rotates (cranks) the crankshaft 9 during a starting operation of the engine 1.

In the engine 1, each combustion chamber 3 is selectively connected to and disconnected from the intake passage 2 by opening and closing of an intake valves 20. Also, each combustion chamber 3 is connected to and disconnected from the exhaust passage by opening and closing of an exhaust valve 21. Rotation of the crankshaft 9 is transmitted to an intake camshaft 22 and an exhaust camshaft 23 that have an intake cam and an exhaust cam respectively. The intake valves 20 and the exhaust valves 21 open and close while being pressed by the intake cam and the exhaust cam as the intake camshaft 22 and the exhaust camshaft 23 are rotated.

A variable valve actuation mechanism 25 is attached to the intake camshaft 22. The variable valve actuation mechanism 25 changes the rotational phase of the intake camshaft 22 relative to rotation of the crankshaft 9, thereby changing the valve timing (opening and closing timing) of intake valves 20. The variable valve actuation mechanism 25 is activated to advance or retard the period of opening of the intake valves 20, so that the opening timing and the closing timing of the intake valves 20 are changed. In this embodiment, the variable valve actuation mechanism 25 is an electrically operated type that drives an electric motor 26, which is a driving device independent of the engine 1, to change the relative rotational phase. In other words, the electric motor 26 functions as a driving device that is capable of operating regardless whether the engine 1 is running or not.

Various types of control processes of the engine 1 are executed by an electronic control device 35 mounted on the vehicle. The electronic control device 35, which functions as a control section, includes a CPU that executes various computation processes related to control of the engine 1, a ROM storing programs and data necessary for the control, a RAM for temporarily storing the computation results of the CPU, and input and output ports for inputting and outputting signals from and to the outside.

The input ports of the electronic control device 35 are connected to various types of sensors listed below:

a crank position sensor 10 that outputs a signal that corresponds to rotation of the crankshaft 9;

a cam position sensor 24 for detecting the rotational position of the intake camshaft 22;

an accelerator pedal sensor 14 for detecting the degree of depression of the accelerator pedal 13 (accelerator pedal depression degree);

a throttle position sensor 15 for detecting the opening degree of the throttle valve 11;

an air flow meter 12 for detecting the amount of air passing through the intake passage 2;

an ignition switch 8 that is switched among four positions, or OFF, ACCESSORY, ON, and START positions, and outputting a signal that corresponds to the currently selected position;

a brake switch 17 for detecting whether a brake pedal 16 is being depressed by a driver of the vehicle; and a vehicle speed sensor 18 for detecting the vehicle speed.

The output ports of the electronic control device 35 are connected to drive circuits of the fuel injection valves 4, the ignition plugs 5, the throttle valve 11, the variable valve actuation mechanism 25 (the electric motor 26), and the starter 19.

Based on detected signals of the above described sensors, the electronic control device 35 obtains the operating condition of the engine 1. According to the operating condition, the electronic control device 35 outputs command signals to the drive circuits of the devices connected to the output ports. The electronic control device 35 executes control of fuel injection amount from the fuel injection valves 4, control of the ignition timing of the ignition plugs 5, control of the opening degree of the throttle valve 11, control of the valve timing of the intake valves 20, and control of activation of the starter 19.

Starting and stopping of the engine 1 will now be described.

Starting and stopping of the engine 1 are executed based on manipulation of the ignition switch 8. Specifically, the electronic control device 35 controls activation of the starter 19, fuel injection, and ignition to start and stop the engine 1. Other than starting and stopping of the engine 1, automatic stopping and restarting of the engine 1 are performed according to power demand on the engine 1 for improving the fuel economy of the engine 1. Automatic stopping and restarting of the engine 1 are executed based on whether there is power demand on the engine 1. Specifically, the electronic control device 35 controls fuel injection, ignition, and activation of the starter 19 to perform automatic stopping and restarting of the engine 1. Hereinafter, procedures for starting and stopping the engine 1 will be described. Specifically, starting and stopping of the engine 1 based on manipulation of the ignition switch 8, and automatic stopping and restarting of the engine 1 based on whether there is power demand on the engine 1 will be discussed separately.

[Starting and Stopping of the Engine 1 Based on Manipulation of the Ignition Switch 8]

When the engine 1 is not operating, if an occupant of the automobile successively turns the ignition switch 8 from the OFF position to the START position via the ACCESSORY and ON positions, the engine 1 is commanded to start when the switch 8 is switched to the START position. The starter 19 is thus activated to start cranking of the engine 1. During cranking, fuel and air are supplied to the combustion chambers 3, and air-fuel mixture is ignited. Then, the engine 1 starts operating on its own. Starting of the engine 1 is thus completed.

If the occupant of the automobile successively turns the ignition switch 8 from the ON position to the OFF position via the ACCESSORY position while the engine 1 is operating, fuel injection from the fuel injection valves 4 and ignition by the ignition plugs 5 are stopped when the switch 8 is turned to the ACCESSORY position, accordingly, combustion of fuel mixture is stopped. This initiates the stopping operation of the engine 1. Since turning of the ignition switch 8 from the ON position to the ACCESSORY position is normally done during idling, the engine speed drops from the idling speed to zero after the stopping operation of the engine 1 is initiated, so that stopping of the engine 1 is completed.

[Automatic Stopping and Restarting Based on Whether There is Power Demand on the Engine]

If there is no power demand on the engine 1 while the engine 1 is operating, fuel injection and ignition are stopped so that the engine 1 is automatically stopped. Whether there is power demand on the engine 1 is determined based on whether certain conditions are met simultaneously. For example, it is determined that there is no power demand when (A) the depression degree of the accelerator pedal 13 is zero, (B) the brake pedal 16 is being depressed, and (C) the vehicle speed is less than a predetermined value Da that is close to zero. When all the conditions (A) to (C) are all met, it is determined that there is no power demand on the engine 1, in other words, that the engine 1 does not need to be operated. Accordingly, the engine 1 is automatically stopped.

If power demand on the engine occurs after the engine 1 is automatically stopped, that is, if one or more of the conditions (A) to (C) ceases being met, a command for starting the engine 1 is issued, so that the starter 19 is activated to start cranking the engine 1. Fuel injection and ignition during cranking initiate autonomous operation of the engine 1. In other words, the engine 1 is automatically restarted.

Valve timing control of the intake valves 20 when the engine 1 is stopped will now be described.

The engine stopping process is initiated during idling of the engine 1 either in the case the engine 1 is stopped based on manipulation of the ignition switch 8 or in the case where the engine 1 is stopped due to no power demand on the engine 1.

During idling, to perform stable combustion while guaranteeing necessary compression ratio, the valve timing of intake valves 20 is set to timing that guarantees the compression ratio (hereinafter, referred to as idling valve timing). On the other hand, when the engine starting operation is initiated (when cranking of the engine is started), the compression ratio is preferably lowered to reduce shock. Specifically, it is preferable that the valve timing of the intake valves 20 be further retarded compared to the idling valve timing to the most retarded timing so that each valve 20 is closed at the most retarded timing.

Therefore, after the engine stopping operation is initiated, the variable valve actuation mechanism 25 is controlled such that the valve timing of the intake valves 20 is changed from the idling valve timing to the most retarded timing in preparation for the next starting of engine. A procedure for controlling the valve timing of the intake valves 20 when stopping the engine 1 will now be described with reference to a stopping process routine of FIG. 2. The stopping process routine is executed as an interrupt by the electronic control device 35, for example, at predetermined time intervals.

At step S101, whether a command for stopping the engine 1 has been issued is determined. This engine stopping command is either for stopping the engine 1 based on manipulation of the ignition switch 8 or for causing the engine 1 to automatically stop when there is no power demand on the engine 1. If the outcome of step S101 is positive, the engine 1 is in the idling state, and the valve timing of the intake valves 20 is set at the idling valve timing, which is advanced compared to the most retarded valve timing. When step S102 is executed based on the positive outcome of step S101, the valve timing of the intake valves 20 is retarded from the idling valve timing to the most retarded timing. Such a change of the valve timing is executed by activating the variable valve actuation mechanism 25 with the electric motor 26.

Figure 3:
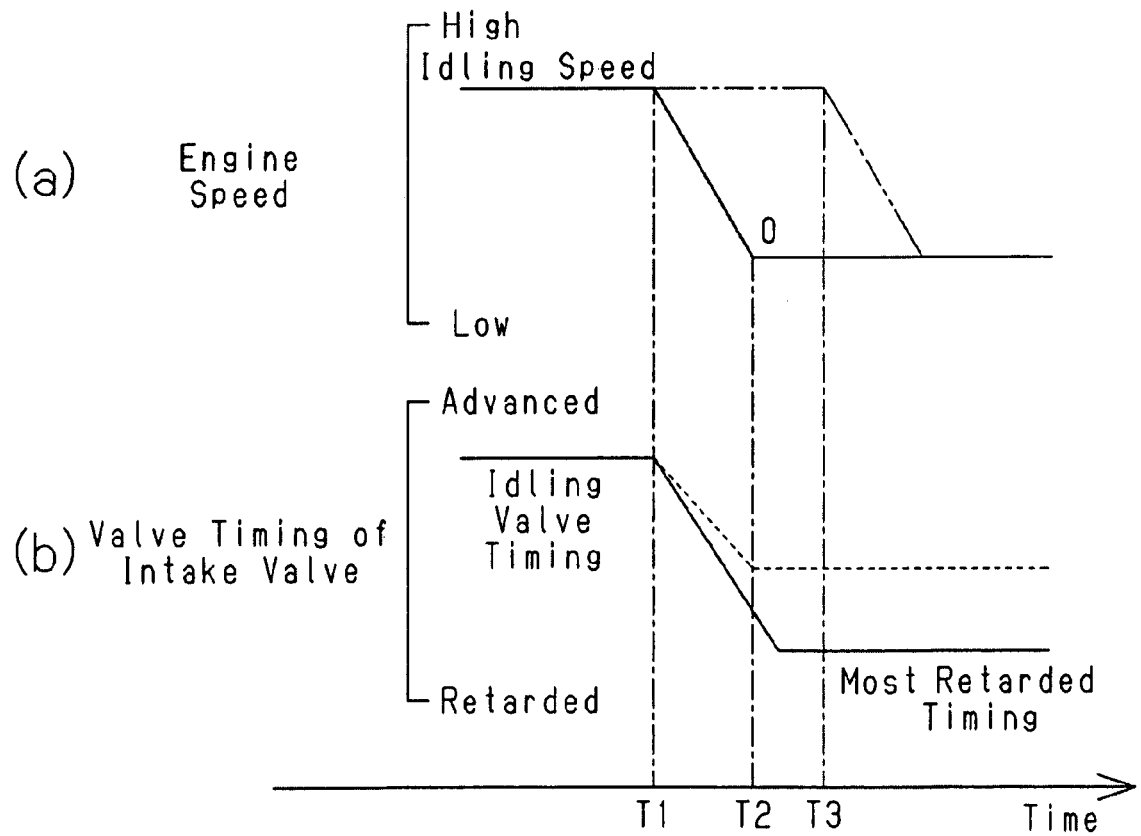
FIG. 3 is a time chart, in which section (a) shows a reduction in the engine speed when the engine is stopped, and section (b) shows changes in the valve timing of the intake valves.

FIG. 3 is a time chart showing a reduction in the engine speed when the engine stopped, and change in the valve timing of the intake valves 20. The engine speed starts decreasing from the idling speed when the stopping process of the engine is initiated based on the engine stopping command as shown by a solid line in section (a) of FIG. 3 (time T1), and then drops to zero (time T2). On the other hand, the valve timing of the intake valves 20 is changed from the idling valve timing to the most retarded timing as the engine stopping process is initiated.

If the variable valve actuation mechanism 25 is a hydraulic type as the one described in BACKGROUND OF THE INVENTION section, the oil pressure discharged from the mechanical oil pump is lowered as the engine speed decreases after the engine stopping process is initiated. Therefore, the force that drives the variable valve actuation mechanism 25 is reduced. As a result, the valve timing of the intake valves 20 cannot be retarded to the most retarded valve timing during the period in which the engine speed drops to zero. That is, as shown by a broken line in section (b) of FIG. 3, the engine speed can drop to zero when the valve timing is advanced compared to the most retarded timing. In this case, as discussed in BACKGROUND OF THE INVENTION section, the next cranking of the engine 1 will be started with a relatively high compression ratio. This will produce a shock and disturbs the occupants.

To avoid such drawbacks, the valve timing of the intake valves 20 may be changed to the most retarded timing before starting the stopping operation of the autonomous operation of the engine 1. In this case, when an engine stopping command is issued (time T1), idling is continued to maintain the engine speed at the idling speed as indicated by an alternate long and two short dashes line in section (a) of FIG. 3. In this state, the valve timing of the intake valves 20 is changed from the idling valve timing to the most retarded timing. Then, after the valve timing becomes the most retarded timing (after time T3), the engine stopping process is initiated so that the engine speed is reduced to zero as shown by the alternate long and two short dashes line in section (a) of FIG. 3. Although shock at the beginning of cranking is suppressed, the valve timing of the intake valves 20 is retarded compared to the idling valve timing during idling (T1 to T3) until the valve timing is set to the most retarded timing. Therefore, during idling (T1 to T3) as indicated by an alternate long and two short dashes line in section (a) of FIG. 3, combustion cannot be executed while guaranteeing a necessary compression ratio. Accordingly, the combustion becomes unstable and the fuel economy inevitably deteriorates.

In this respect, the variable valve actuation mechanism 25 of the present embodiment is driven by the electric motor 26. After the process for stopping the autonomous operation of the engine 1 is initiated, the valve timing of the intake valves 20 is retarded from the idling valve timing to the most retarded timing.

In this case, the variable valve actuation mechanism 25 is driven by a driving device independent of the engine 1. Thus, even if the engine speed drops after the engine stopping process is initiated (after time T1), this does not affect the activation of the variable valve actuation mechanism 25. Therefore, by activating the variable valve actuation mechanism 25 to retard the valve timing of the intake valves 20 after the engine stopping process is initiated, the valve timing of the intake valves 20 is reliably retarded to the most retarded timing as shown by solid line in section (b) of FIG. 3. In this case, since the valve timing of the intake valves 20 does not have to be retarded compared to idling valve timing during idling of the engine 1 as indicated by the alternate long and two short dashes line in section (a) of FIG. 3, the fuel economy is prevented from decreasing.

Figure 4:
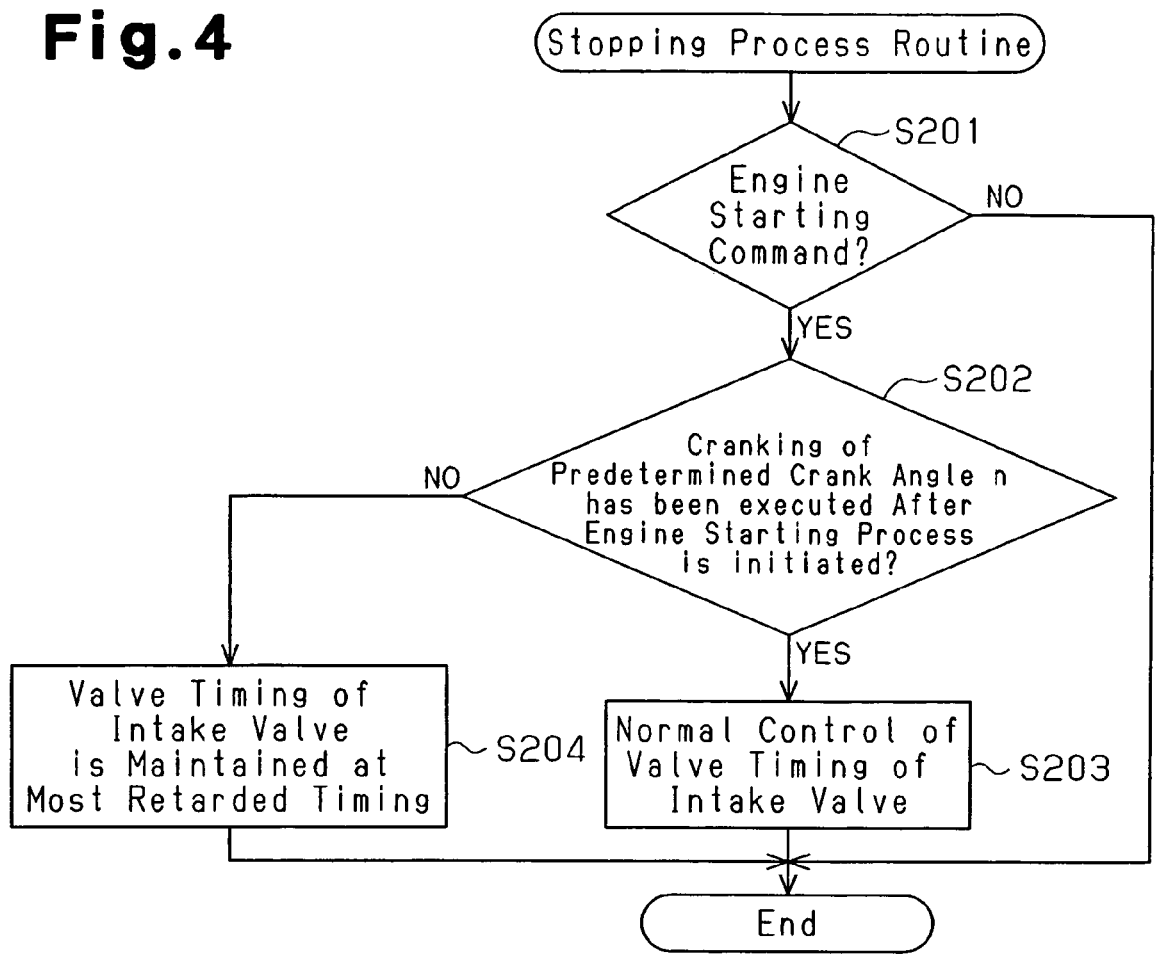
FIG. 4 is a flowchart showing a procedure for controlling the valve timing of the intake valves when starting the engine.

A procedure for controlling the valve timing of the intake valves 20 when starting the engine 1 will now be described with reference to a starting process routine of FIG. 4. The starting process routine is executed as an interrupt by the electronic control device 35, for example, at predetermined time intervals.

At step S201, whether a command for starting the engine 1 has been issued is determined. This engine starting command is either for starting the engine 1 based on manipulation of the ignition switch 8 or for restarting the engine 1 when there is power demand on the engine 1 occurs. If the outcome of step S201 is positive, whether cranking of a predetermined crank angle n has been executed after the engine starting process is initiated is determined (S202). The value of the crank angle n may be a degree of the crank angle required for distinguishing the cylinders after the engine starting process is initiated. In this case, the determination of step S202 is made based on whether the cylinders have been distinguished after the engine starting process is initiated (after cranking is started).

That is, if the cylinders have not been distinguished after the engine starting process is initiated (after cranking is started), it is determined that cranking of the predetermined crank angle n has not been completed at step S202. In this case, the valve timing of the intake valves 20 is maintained at the most retarded timing (S204). If the valve timing of the intake valves 20 is set at the most retarded timing, the closing timing of each valve 20 is relatively delayed, and thus the compression ratio is reduced. When the cranking is started for starting the engine 1, the valve timing is set at the most retarded timing. This state is maintained from when the starting operation is initiated to when the cranking of a predetermined crank angle n is completed. Thus, cranking is not started with a high compression ratio, and shock due to cranking with a high compression ratio is prevented.

On the other hand, if the cylinders have been distinguished after the engine starting process is initiated (after cranking is started), it is determined that cranking of the predetermined crank angle n is completed at step S202. Immediately after the outcome of step S202 is determined to be positive, cranking is still being executed. Based on the positive outcome of step S202, a normal control of the valve timing of the intake valves 20 is executed (S203). Through the valve timing control, the valve timing of the intake valves 20 is advanced from the most retarded timing to the idling valve timing. Therefore, when cranking of the predetermined crank angle n is completed after the starting operation of the engine 1 is initiated, the valve timing starts being advanced from the most retarded timing during cranking.

Figure 5:
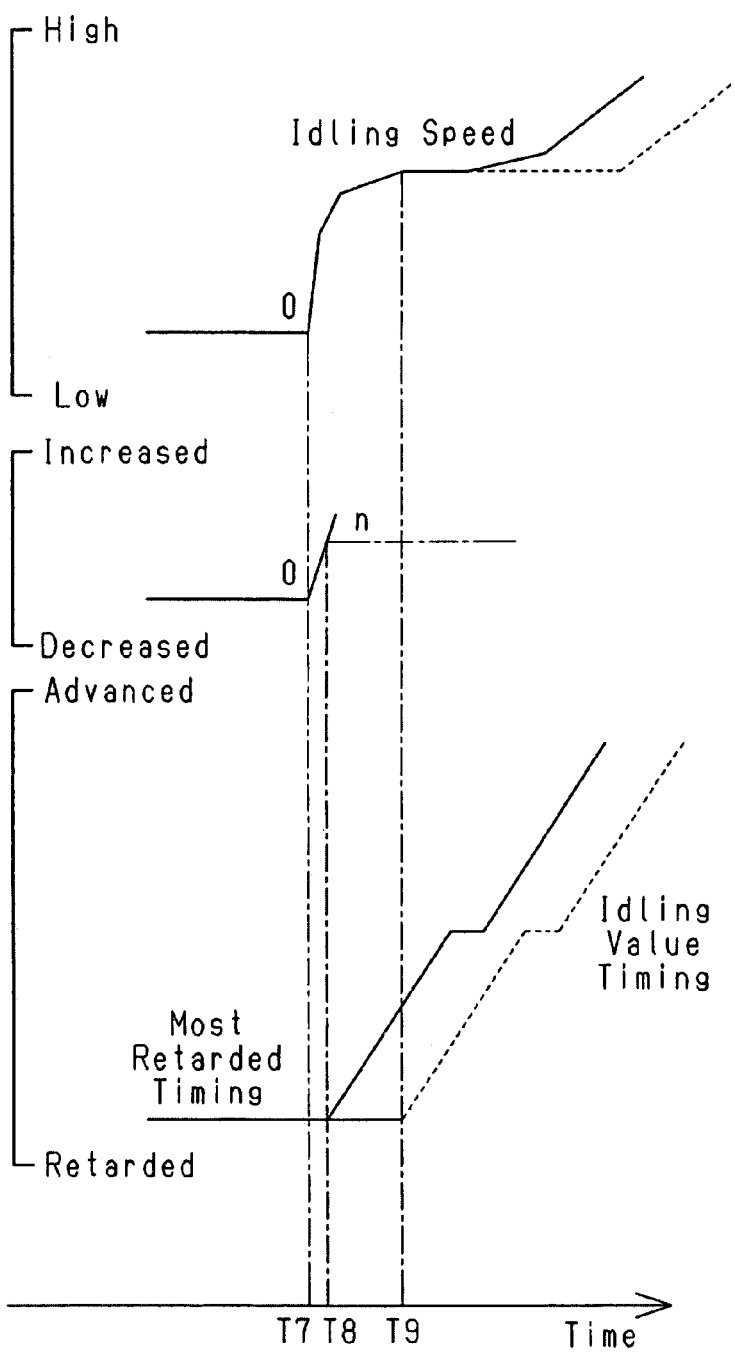
FIG. 5 is a time chart, in which section (a) shows rise of the engine speed when starting the engine, section (b) shows increase in the crank angle due to cranking after initiating an engine starting operation, and section (c) shows changes in the valve timing of the intake valves.

FIG. 5 is a time chart showing increase in the engine speed when the engine is being started, increase in the degree of cranking, and a change in the valve timing of the intake valves 20. When the cranking is started based on the engine starting command (time T7), the valve timing of the intake valves 20 is set at the most retarded timing. This prevents shock from occurring due to start of cranking. Also, after cranking is started, the engine speed and the crank angle that has been advanced due to cranking are increased as shown in sections (a) and (b) of FIG. 5.

If the variable valve actuation mechanism 25 is of an oil pressure type as described above, oil discharged from a mechanical oil pump is not sufficiently supplied to the variable valve actuation mechanism 25 until the engine speed is increased to a certain level. Accordingly, the force to drive the mechanism 25, which depends on the oil pressure, is reduced. Therefore, even if the valve timing of the intake valves 20 needs to be advanced from the most retarded timing in an early stage after the starting operation of the engine 1 is initiated, for example, during cranking, the variable valve actuation mechanism 25 cannot be properly activated to advance the valve timing. In this respect, in the case where a hydraulic type variable valve actuation mechanism is adopted, the autonomous operation of the engine may be started after the starting operation of the engine is initiated. In this case, after the engine speed reaches the idling speed (after time T9), the valve timing of the intake valves 20 is advanced toward the idling valve timing as shown by broken line in section (c) of FIG. 5.

However, in the engine 1 that performs automatic stopping and restarting, for example, the accelerator pedal 13 is possibly depressed during the automatic stopping of the engine 1. Accordingly, the corresponding power demand on the engine 1 causes the engine 1 to be restarted. When the power demand on the engine 1 is great, the valve timing of the intake valves 20 is normally advanced to increase the air charging efficiency for obtaining the higher power from the engine 1. Advancement of the valve timing increases the air charging efficiency because the advanced valve timing causes the intake valves 20 to be closed at an advanced timing and prevents intake air into the intake passage 2 from flowing back. With the air charging efficiency increased, the amount of fuel injection from the fuel injection valves 4 increased, so that a greater amount of air-fuel mixture is burned. This increases the power of the engine 1.

In the case where the engine 1 is restarted in response to depression of the accelerator pedal 13, the power demand on the engine 1 is great immediately after the starting operation of the engine 1 is initiated. In this case, the valve timing of the intake valves 20 is preferably quickly advanced from the most retarded timing, so that the power of the engine 1 is quickly increased in response to the power demand. However, in the case where a hydraulic type mechanism is adopted as the variable valve actuation mechanism 25, the valve timing only starts being advanced from the most retarded timing when the engine speed reaches the idling speed after the starting operation of the engine 1 is initiated. That is, advancement of the valve timing for increasing the engine power is started at a relatively later stage as shown by broken line in section (b) of FIG. 5. Thus, the increase in the power of the engine 1 is delayed. This causes increase in the engine speed to be delayed as shown by a broken line in section (a) of FIG. 5.

In this respect, since the variable valve actuation mechanism 25 of the present embodiment is driven by the electric motor 26, which is a driving device independent of the engine 1, the valve timing of the intake valves 20 can be advanced from the most retarded timing immediately after cranking is started. During cranking immediately after cranking is started, if cranking of the predetermined crank angle n is completed (time T8), the valve timing starts being advanced from the most retarded timing as shown by a solid line in section (b) of FIG. 5. Therefore, even if there is a great power demand on the engine 1 immediately after the starting operation of the engine 1 is initiated as described above, the valve timing is quickly advanced as shown by a solid line in section (c) of FIG. 5 immediately after the starting operation is initiated through the normal valve timing control (S203 in FIG. 4). As a result, the power of the engine 1 is reliably increased in response to the power demand. Also, the engine speed is quickly increased as shown by a solid line in section (a) of FIG. 5.

The above described embodiment has the following advantages.

(1) The variable valve actuation mechanism 25 is driven by the electric motor 26, which is a driving device independent of the engine 1. Thus, even if the engine speed drops after the engine stopping process is initiated, this does not affect the activation of the variable valve actuation mechanism 25. Therefore, by activating the variable valve actuation mechanism 25 to retard the valve timing of the intake valves 20 after the engine stopping process is initiated, the valve timing of the intake valves 20 is reliably retarded to the most retarded timing. In this case, when the engine 1 is stopped, the valve timing during idling does not need to be changed from the idling valve timing to the most retarded timing before the engine stopping operation is initiated. This prevents the fuel economy from decreasing. Accordingly, the valve timing of the intake valves 20 when the engine starting operation is initiated (when cranking is started) can be set to the most retarded timing, so that shock due to initiating of the starting operation is avoided without decreasing the fuel economy.

(2) Since the engine 1 performs automatic stopping and restarting according to power demand, the engine 1 is stopped and started relatively frequently. In other words, the engine 1 is stopped relatively frequently. The fuel economy is therefore likely to decrease. Further, when restarting the engine 1 after the automatic stopping, a smooth starting of the engine 1 is desired. Thus, shock due to starting can be a great problem. Such decrease in the fuel economy and occurrence of shock are avoided.

(3) When cranking is started for starting the engine 1, the valve timing of the intake valves 20 is set at the most retarded timing. This state is maintained from when the engine starting operation is initiated to when the cranking of a predetermined crank angle n is completed. Thus, cranking is not started with a high compression ratio, and shock due to cranking with a high compression ratio is reliably prevented.

(4) In the case where the accelerator pedal 13 is depressed during the automatic stopping of the engine 1, and the engine 1 is being restarted, the power demand on the engine 1 is great immediately after the engine starting operation is initiated. In this case, the valve timing of the intake valves 20 is preferably quickly advanced from the most retarded timing, in order that the power of the engine 1 is quickly increased in response to the power demand. In this respect, since the variable valve actuation mechanism 25 of the present embodiment is driven by the electric motor 26, the valve timing of the intake valves 20 can be advanced from the most retarded timing during cranking immediately after cranking is started. Then, when cranking of the predetermined crank angle n is completed after cranking is started, the valve timing starts being advanced from the most retarded timing. Therefore, even in the case where the power demand on the engine 1 is great immediately after the engine starting operation is initiated as described above, the valve timing of the intake valves 20 is quickly advanced so that the power of the engine 1 is quickly increased according to the power demand.

The above described embodiment may be modified as follows.

The variable valve actuation mechanism 25 may be of a hydraulic type, and oil may be supplied to the mechanism 25 with an electric oil pump. In this case, the electric oil pump supplies oil to the variable valve actuation mechanism 25 without being affected by a reduction in the engine speed due to stopping of the engine 1. Therefore, the electric oil pump functions as an electric machine included in a driving device that operates and drives the variable valve actuation mechanism 25 regardless whether the engine 1 is running or not.

As the predetermined crank angle n used in step S202 of the starting process routine (FIG. 4), a crank angle required for performing several strokes of compression in the cylinder after the engine starting process is initiated may be used instead of the crank angle required for distinguishing the cylinders after the engine starting process is initiated.

The value of the predetermined crank angle n may be varied according to power demand on the engine 1 after the engine starting process is initiated. In this case, when the power demand on the engine 1 becomes greater after the engine starting operation is initiated, time at which the valve timing of the intake valves 20 starts being advanced from the most retarded timing is adjusted in accordance with the degree of the power demand. As a value representing the power demand on the engine 1, an accelerator pedal depression degree may be used. One modification in which the predetermined crank angle n is varied is as follows. That is, as the accelerator pedal depression degree increases, in other words, as the power demand on the engine 1 increases, the predetermined crank angle n is decreased.

In the illustrated embodiment, the valve timing of the intake valves 20 starts being advanced from the most retarded timing during cranking after the engine started. However, the valve timing may start being advanced after the idling operation is initiated. In this case, the item (1) of the above advantages, that is, shock due to initiating of the starting operation is avoided without decreasing the fuel economy, is provided.

In the determination of the condition (C), which is used for determining whether there is power demand on the engine 1 while the engine 1 is being automatically stopped, the predetermined value Da may have a value other than that presented in the above embodiment. For example, the predetermined value Da may be zero. In this case, the condition (C) is that the vehicle speed is equal to a predetermined value Da that is zero.

The present invention may be applied to an engine that is started and stopped only through manipulation of the ignition switch 8.

The invention claimed is:

1. A valve timing control apparatus for an intake valve of an internal combustion engine, comprising:
 a driving device that is capable of operating regardless whether the engine is running or not;

a variable valve actuation mechanism that changes the valve timing of the intake valve, wherein the variable valve actuation mechanism is driven by the driving device;

a control section, wherein:

during an idling operation of the engine, the control section controls the driving device such that the variable valve actuation mechanism maintains the valve timing at a valve timing advanced relative to a most retarded valve timing; and after a stopping operation of an autonomous operation of the engine is initiated, the control section controls the driving device, even after the engine has stopped running, such that the variable valve actuation mechanism changes the valve timing to the most retarded valve timing.

2. The control apparatus according to claim 1:

wherein, from when cranking of the engine is started to when the engine rotates a predetermined angle, the control section controls the driving device such that the variable valve actuation mechanism maintains the valve timing at the most retarded valve timing, and the control section subsequently controls the driving device such that the variable valve actuation mechanism advances the valve timing from the most retarded valve timing.

3. The control apparatus according to claim 2:

wherein the engine is automatically stopped according to power demand on the engine; and wherein, when the engine is restarted after being automatically stopped, the control section varies the predetermined angle according to the power demand at the time of starting of cranking of the engine.

4. The control apparatus according to claim 1, wherein the engine is automatically stopped and restarted according to power demand on the engine.

5. The control apparatus according to claim 1, wherein the driving device includes an electric machine.

6. A valve timing control method for an intake valve of an internal combustion engine, comprising:

varying the valve timing of the intake valve by using a variable valve actuation mechanism;

driving the variable valve actuation mechanism by a driving device that is capable of operating regardless whether the engine is running or not;

controlling, during an idling operation of the engine, the driving device such that the variable valve actuation mechanism maintains the valve timing at a valve timing advanced relative to a most retarded valve timing; and controlling, after a stopping operation of an autonomous operation of the engine is initiated, the driving device such that the variable valve actuation mechanism changes the valve timing to the most retarded valve timing, even after the engine has stopped running.

7. The control method according to claim 6, further comprising:

cranking the engine;

controlling, from when cranking of the engine is started to when the engine rotates a predetermined angle, the driving device such that the variable valve actuation mechanism maintains the valve timing at the most retarded valve timing; and subsequently controlling the driving device such that the variable valve actuation mechanism advances the valve timing from the most retarded valve timing.

8. The control method according to claim 7, further comprising:

causing the engine to be automatically stopped according to power demand on the engine; and varying, when the engine is restarted after being automatically stopped, the predetermined angle according to the power demand at the time of starting of cranking of the engine.

9. The control method according to claim 6, further comprising:

causing the engine to be automatically stopped and restarted according to power demand on the engine.

10. The control method according to claim 6, wherein the driving device includes an electric machine.

* * * * *